May 16, 1944.　　　J. H. RICHARDS　　　2,349,004
MILLING MACHINE
Filed June 2, 1942　　　2 Sheets-Sheet 1

INVENTOR.
JAMES H. RICHARDS,
BY [signature]
ATTORNEY.

May 16, 1944.　　J. H. RICHARDS　　2,349,004
MILLING MACHINE
Filed June 2, 1942　　2 Sheets-Sheet 2
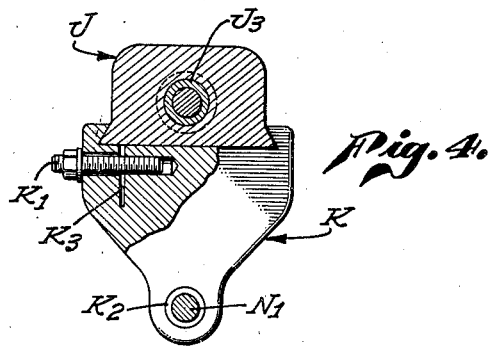
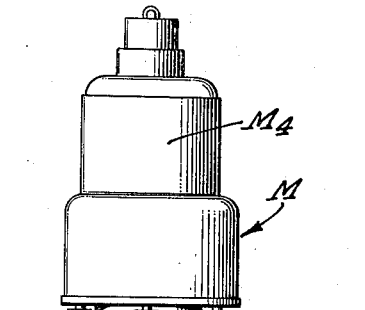
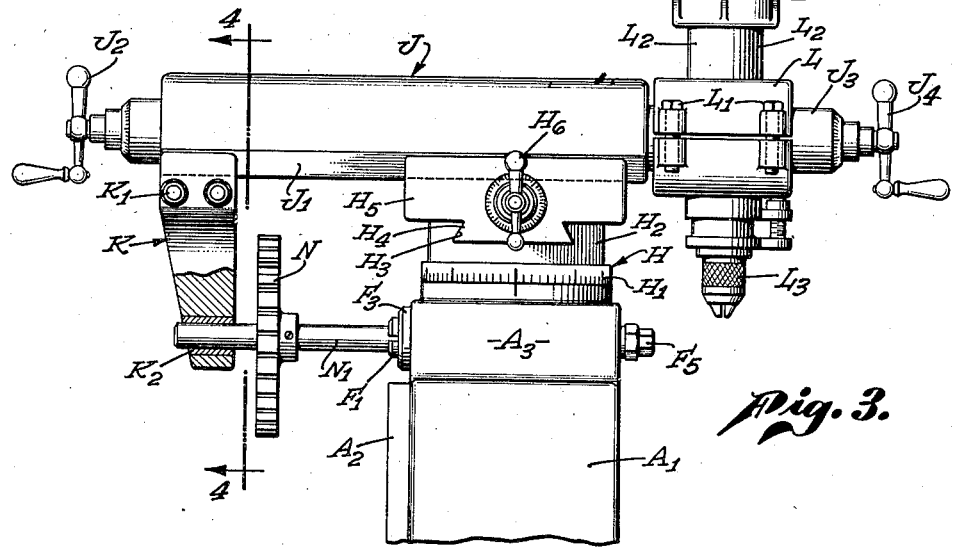
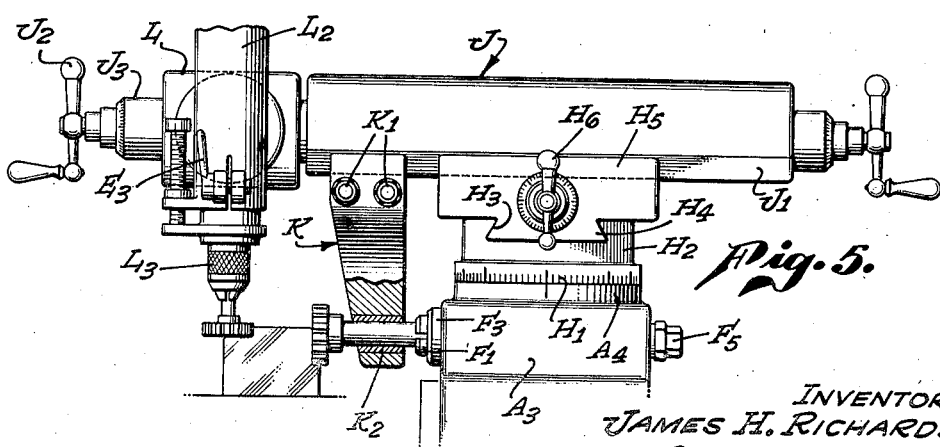
INVENTOR.
JAMES H. RICHARDS,
BY Luther L. Macs
ATTORNEY.

Patented May 16, 1944

2,349,004

UNITED STATES PATENT OFFICE 2,349,004

MILLING MACHINE

James H. Richards, Glendale, Calif., assignor to Fray Machine Tool Co.

Application June 2, 1942, Serial No. 445,466

7 Claims. (Cl. 90—17)

This invention comprehends the provision of an improved type of milling machine which combines certain features of heavy duty machines of restricted scope and adaptability with features of my invention hereinafter identified, and a primary additional characteristic including a new type of over-arm which is arranged for rotatable adjustment on a base, to an extent of 360 degrees, and is otherwise adjustable in right angular directions on the rotatable head for at least two purposes, to-wit:

First: The operative support of an all-angle auxiliary milling attachment having an integrally supported motor which is so mounted as to afford adjustment of a tool relative to the work about two or more axes to an extent of 360 degrees or less and otherwise in different horizontal, vertical and inclined planes.

Second: The provision on the base of the machine of a usual tool spindle driven by a separate motor and an out-board bearing for the tool arbor which is carried by the over-arm and is arranged to be operatively and inoperatively positioned, at the will of the operator, through the rotatable and horizontal adjustment of the over-arm on the head.

An object, therefore, is to combine in a milling machine, the hereinbefore mentioned features accompanied by suitable devices for effecting the adjustment of the several elements and for supporting the elements in adjusted positions. Thus, the tool or tools required for different operations may be adequately adjusted and supported for performing various operations on the work, either by a single tool carried by the horizontal spindle or by the spindle of the all-angle attachment, or as in some cases, by tools carried by both of such spindles for simultaneous operations on the same or different pieces of work.

In considering my present invention I refer to the following pending applications for patent in which structures as shown therein with or without modification, may be utilized for attaining the objects of the instant invention: Serial No. 319,290 filed February 16, 1940; Serial No. 357,021 filed September 16, 1940, Patent No. 2,288,648; and Serial No. 376,324 filed January 28, 1941, Patent No. 2,296,573.

I have shown a prefered form of milling machine embodying my improvements in the accompanying drawings, subject to modification, within the scope of the appended claims, without departing from the spirit of the invention.

In said drawings:

Fig. 3 is a fragmentary side elevation showing the over-arm adjusted so that the outboard support thereon is positioned for receiving a tool arbor connected with the horizontal spindle of the machine;

Fig. 4 is a section on line 4—4 of Fig. 3, and

Fig. 5 is an enlarged elevation, partly in section, showing a supplemental bearing depending from the overarm, and a pair of tools selectively operable on the work.

Figures 1, 2:
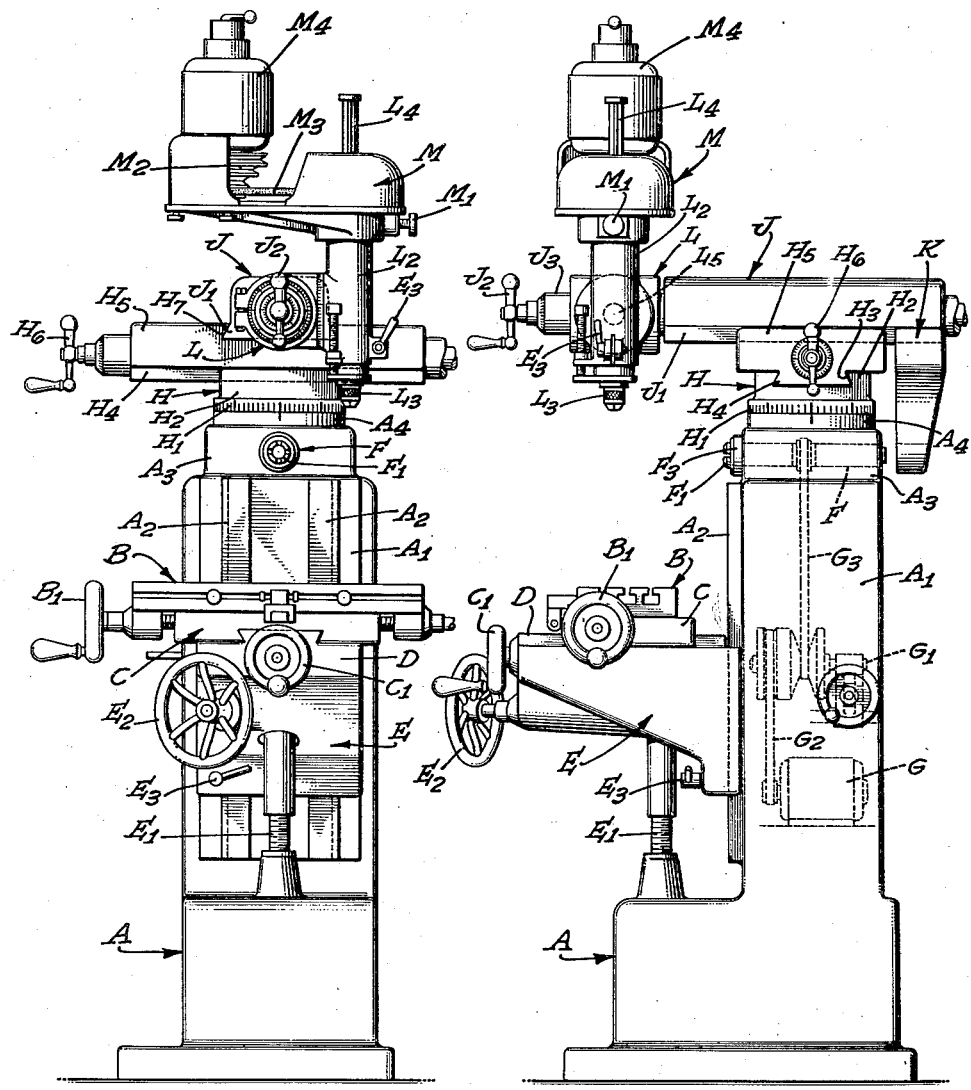
Fig. 1 is a front elevation of an assembled machine.
Fig. 2 is a side elevation thereof.

A milling machine embodying my improvements includes the usual base A with a vertical column $A_1$, a table B adjustably supported on a saddle C which is tongue and groove connected with a bed D formed on or suitably attached to a "knee" E. Table B is arranged to receive and hold the work thereon in fixed engagement with a milling tool or tools in a conventional manner, and is adjustable longitudinally on the saddle C by means of a feed device $B_1$ while the saddle is transversely adjustable on bed D by means of a cross feed device $C_1$.

The knee E is vertically adjustable on column $A_1$ by means of an elevating and lowering screw $E_1$ operated by a hand wheel $E_2$ and is locked in adjusted positions as by means of a frictional lock $E_3$, column $A_1$ having guides $A_2$ thereon which slidably and lockingly engage the knee E.

Column $A_1$ is provided at its top with a circular boss $A_3$ in which a spindle F is rotatably mounted so that a tool may be operatively connected therewith, as shown in Fig. 3 and in a manner hereinafter described. Spindle F is driven from a motor G mounted in base A and connected with and for driving a countershaft $G_1$ through the medium of a belt or chain $G_2$. Countershaft $G_1$ is similarly connected with and drives spindle F as by means of a belt or chain $G_3$.

A turret head H is mounted on the top of column $A_1$ adjacent boss $A_3$ and includes a flange $H_1$ which has a vernier scale of micrometric graduations thereon for registration with a mark or marks on a circular portion $A_4$ of column $A_1$ immediately above boss $A_3$. Turret head H also has a bed $H_2$ which is grooved at $H_3$ (Fig. 2) to slidably receive a tongue $H_4$ formed on the bottom of a saddle $H_5$, so that the saddle and attached parts may be adjusted longitudinally of bed $H_2$ as by means of a feed device $H_6$.

An over-arm J of box or ram type is slidably mounted on the upper side of saddle $H_5$, said saddle having a groove $H_7$ in which a tongue $J_1$ on the bottom of arm J is seated and is adjustable by means of a feed device $J_2$ which moves the arm J and its attachments bodily and transversely of saddle $H_5$.

Arm J carries at one end a depending bearing member K which is detachably held in position on the tongue $J_1$ of the arm by means of clamping bolts or screws $K_1$, the body $K_2$ of said bearing being slit at $K_3$ so that when attached to the arm J the member K will be frictionally held in fixed position.

The over-arm member J has a longitudinally supported stem $J_3$ which is extensible therefrom to a selected extent under the control of a hand operated wheel $J_4$ (Fig. 3) to which an all-angle milling attachment is secured by means of a clamp L and bolts $L_1$. Clamp L has a body $L_2$ which rotatably supports a chuck $L_3$ held on a spindle (not shown) adjustable in a quill $L_4$ and arranged for engagement with the work as shown in my application No. 319,290 hereinabove referred to.

Body $L_2$ adjustably supports a tool driving mechanism including a back geared driven unit M held in adjustable position on body $L_2$ by a set screw $M_1$, or otherwise, a driving unit $M_2$ connected by a belt $M_3$ with said driven unit, and a motor $M_4$ connected with the driving unit $M_2$. Said motor and the associated driving unit $M_2$ and driven unit M are commonly mounted and adjustable to an extent of 360 degrees about the axis of chuck $L_3$ and its spindle.

The assembled attachment including the motor $M_4$, driving unit $M_2$, driven unit M, body $L_2$ and clamp bracket L are simultaneously adjustable to an extent of 360 degrees about the axis of the over-arm stem $J_3$. The driving and spindle carrying units are also commonly adjustable to an extent of 360 degrees about an axis $L_5$ of clamp bracket L (Fig. 2).

Thus, the all-angle attachment is universally adjustable relative to work fixedly supported on table C to any desired angle and, additionally is adjustable longitudinally and transversely relative to the axis of head H and the work. Moreover, as hereinbefore stated the entire milling unit is adjustable on the axis of the turret head H. Thus, by means of the several adjustments mentioned together with the vertical, longitudinal and transverse adjustment of the table B it would appear that any desired relationship of a tool or tools with the work is possible by the employment of my improved mechanism.

It will be understood that suitable friction locks such as $E_3$ may be employed for holding associated parts in preestablished positions, such elements not being a part of my present invention.

In operation, the table B is elevated and adjusted longitudinally of saddle C and transversely with the saddle C on knee E into approximate operative position with the work (not shown) fixed thereto. If the spindle F is to be used, as shown in Fig. 3, the head H is rotated and set as shown with the out-board bearing K axially alined with said spindle. A tool N carried on an arbor $N_1$, is then positioned in a bearing $K_2$ of member K and a collet $F_1$ coaxial with spindle F by means of which the arbor is rotatably connected with the spindle. Additionally, as in usual practice the arbor may be clutched to the spindle by means of a member $F_3$ on the spindle and a mating member carried by the arbor by any suitable means, such means not being material to this invention.

Connection between arbor $N_1$ and spindle F is established and released by a usual drawing bolt $F_5$ (Fig. 3). When the spindle F is not required for some classes of work the head H is rotated preferably into the position shown in Fig. 2 with the member K out of interference with milling operations desired to be performed by the all-angle attachment carried by head H. In such event the turret head H, motor $M_4$, body $L_2$, bracket L, over-arm J, saddle $H_5$, and chuck $L_3$ are adjusted to a desired angle and position relative to work held on table B and ensuing milling operations are effected with a suitable tool held in chuck $L_3$.

In some cases it is possible to operate on work simultaneously with a tool N on spindle F and a tool carried by chuck $L_3$, as in certain facing operations. Hence, there is a substantial degree of cooperation between all of the elements of my machine which is not present in other machines and which tends to greatly simplify and reduce the cost of certain operations (shown in Fig. 5).

What I claim is:

1. A milling machine comprising: a base, a turret head rotatable to an extent of 360 degrees thereon and including a saddle adjustable diametrically of said head, an over-arm also adjustable diametrically of said head in a direction at right angles to the direction of adjustment of said saddle, a stem longitudinally adjustable in the over-arm, a universally adjustable tool supporting attachment solely supported on said stem, and means on said base for adjustably supporting work relative to a tool carried by said attachment.

2. A milling machine comprising: a base, a turret head rotatable to an extent of 360 degrees thereon and including a saddle adjustable diametrically of said head, an over-arm also adjustable diametrically of said head in a direction at right angles to the direction of adjustment of said saddle, a stem longitudinally adjustable in the over-arm, a universally adjustable tool supporting attachment solely supported on said stem, means on said base for adjustably supporting work relative to a tool carried by said attachment, and means for bodily adjusting said attachment both axially and longitudinally on said over-arm.

3. A milling machine comprising: a base, a turret head rotatable to an extent of 360 degrees thereon and including a saddle adjustable diametrically of said head, an over-arm also adjustable diametrically of said head in a direction at right angles to the direction of adjustment of said saddle, a stem longitudinally adjustable in the over-arm, a universally adjustable tool supporting attachment solely supported on said stem, means on said base for adjustably supporting work relative to a tool carried by said attachment, a tool spindle carried by said base, and a bearing member carried by said over-arm capable of being alined with said spindle and cooperating with said spindle to rotatably support a tool for engagement with work, whereby a tool carried by said attachment and a tool carried by said spindle may be rendered selectively operative on the work by the adjustment of the overarm.

4. A milling machine comprising: a base, a turret head rotatably supported thereon, an overarm adjustably supported on said head for independent movement in relatively right angular directions with respect to the axis of the head and also rotatable with said head on the base as a unit, a bearing member carried by said overarm and adjustable on and with said overarm for movement into and from supporting position relative to a tool spindle, a stem longitudinally adjustable on the overarm, an independently operated milling attachment carried by said stem for supporting and operating a tool for engagement with said work when said tool spindle is inoperative, said attachment being rotatably and longitudinally adjustable on said stem.

5. A milling machine comprising: a base, a tool spindle rotatable thereon, means for supporting work for engagement by a tool driven by said spindle, and an over-arm rotatably and horizontally adjustable in two relatively right angular directions on said base and provided with a bearing adapted to cooperate with said base in operatively supporting a tool, said bearing being longitudinally movable into and from positions of alinement with said spindle, said overarm having a longitudinally adjustable stem arranged to support a second tool, said overarm being adjustable, selectively, for rendering either of said tools operative in a given operation.

6. A milling machine comprising: a base having a vertical column, a spindle rotatable on the upper portion of said column, a turret mounting at the top of said column, a head rotatable on said mounting, a saddle diametrically adjustable on said head, and an over-arm adjustable diametrically on said saddle and having an adjustable stem arranged to support a tool, and a bearing on said overarm for operatively supporting a second tool relative to work held on said base, said head, overarm and bearing being commonly adjustable as a unit for selectively rendering said tools operative.

7. A milling machine comprising: a base having a vertical column, a spindle rotatable on the upper portion of said column, a turret mounting at the top of said column, a head rotatable on said mounting to an extent of 360 degrees, a saddle diametrically adjustable on said head, an overarm diametrically adjustable on said saddle at right angles to the direction of adjustment of the saddle on the head, for selectively supporting said spindle, and an auxiliary milling attachment carried by the overarm for operation on work held on said base, said overarm having an adjustable bearing for supporting said spindle and rotatably adjustable therewith for movement to and from alinement with said spindle, whereby a selected tool may be operatively supported in a milling operation.

JAMES H. RICHARDS.